United States Patent [19]

Ogawa et al.

[11] 4,433,433
[45] Feb. 21, 1984

[54] SAMPLING PULSE FORMING CIRCUIT FOR FM STEREO DEMODULATOR

[75] Inventors: Atsushi Ogawa; Yoshimasa Hayashi, both of Tokyo, Japan

[73] Assignee: Trio Kabushiki Kaisha, Tokyo, Japan

[21] Appl. No.: 263,884

[22] Filed: May 15, 1981

[51] Int. Cl.$^3$ .............................................. H04H 5/00
[52] U.S. Cl. ........................................ 381/7; 329/112; 329/122
[58] Field of Search ............. 179/1 GE, 1 GB, 1 GD; 329/112, 122, 126; 381/7

[56] References Cited

U.S. PATENT DOCUMENTS

| | | | |
|---|---|---|---|
| 3,902,019 | 8/1975 | Bruene | 179/1 GE |
| 3,961,276 | 6/1976 | Kurata | 329/126 X |
| 3,962,551 | 6/1976 | Gay | 179/1 GE |
| 4,037,055 | 7/1977 | Sato et al. | 179/1 GE |
| 4,264,784 | 4/1981 | Lorea | 179/1 GE |

FOREIGN PATENT DOCUMENTS

55:28661 2/1980 Japan .............................. 179/1 GE

Primary Examiner—R. J. Hickey
Attorney, Agent, or Firm—Gerald J. Ferguson, Jr.; Joseph J. Baker

[57] ABSTRACT

A sampling pulse generator circuit for a stereo demodulator circuit of a sample and hold system is disclosed. The pulse generator circuit uses pilot signals of an FM stereo broadcast as an input and produces output sampling pulses, which are phase-synchronized to the stereo subcarrier but have a 180° phase difference to each other. The pulse generator circuit comprises a phase lock loop circuit having a multiple number of frequency dividers arranged in cascade. Selected outputs of these frequency dividers are logically summed to produce the output sampling pulses with a predetermined and stable pulse width.

10 Claims, 2 Drawing Figures

SAMPLING PULSE FORMING CIRCUIT FOR FM STEREO DEMODULATOR

BACKGROUND OF THE INVENTION

This invention relates to a sampling pulse generator circuit for the stereo demodulator circuit of FM stereo receivers, especially a stereo demodulator circuit of a sample and hold system.

The stereo demodulator circuit of the sample and hold system has a sample and hold circuit which samples composite signals by using a pair of sampling pulses which are phase-synchronized to the stereo subcarrier and have a 180° phase difference to each other. The sampled signals are held to separate main signals and subsignals divided into left and right channel signals.

In the stereo demodulator circuit of the sample and hold system, a pulse width of about 1.5 μsec of a 38 KHz sampling pulse will suffice for separating the left and right channel signals when considering the response speed of the circuit and the degree of separation to obtain sufficient performance. For this purpose, a 304 KHz (pulse width ≃1.5 μsec) pulse is used.

Conventionally, this sampling pulse has been obtained by using an integrating circuit comprised of resistors and capacitors with a time constant properly selected, and by performing logic operations on signals delayed through the integrating circuit and signals not delayed, i.e. by-passing the integrating circuit. However, the pulse width of the sampling pulse is affected by the time constant of the integrating circuit, and there is a shortcoming that the temperature characteristic of the integrating circuit is not constant and the pulse width of the sampling pulse is not a constant, either.

SUMMARY OF THE INVENTION

This invention was made in view of the above problem, and the object is to provide a sampling pulse generator circuit without the above shortcoming.

This invention is characterized by the fact that it uses as an input the pilot signals of an FM stereo broadcast as an input and combines waveforms of a multiple number of frequency dividers arranged in cascade in a phase lock loop (PLL) circuit to obtain sampling pulses which are phase-synchronized to the stereo subcarrier, have a 180° phase difference to each other, and have a predetermined pulse width. Stable sampling pulses can be obtained because a PLL circuit is used and the pulses are produced by combining divided square waves.

BRIEF DESCRIPTION OF DRAWING

The invention is explained below based on a preferred embodiment with reference to the drawing, in which.

DETAILED DESCRIPTION OF THE INVENTION

Figure 1:
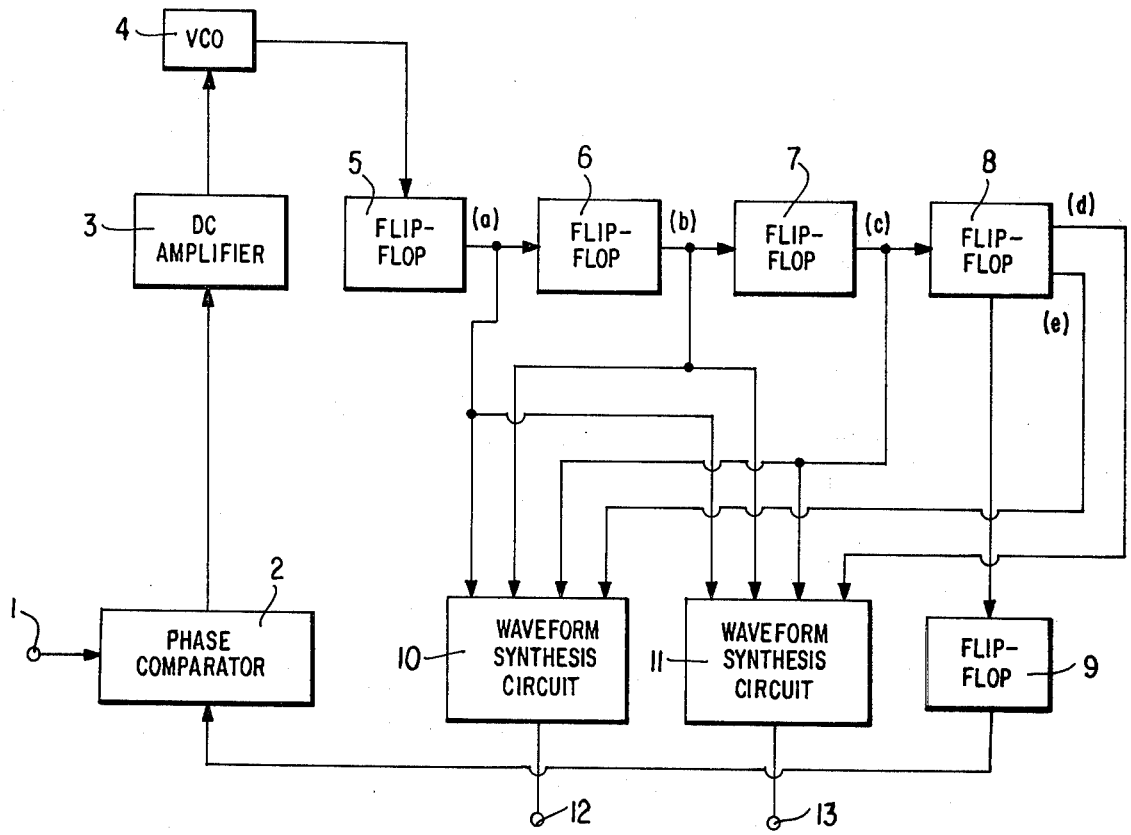
FIG. 1 is a block diagram of one practical example representing the preferred embodiment of the invention.

Referring now to the drawing, and more particularly to FIG. 1, the 19 KHz pilot signal of the composite FM stereo broadcast is applied to input terminal 1 of phase comparator 2. The output of the phase comparator 2, which represents an error signal, is amplified by DC amplifier 3 and applied to the control input of voltage controlled oscillator (VCO) 4. The free-running frequency of oscillator 4 is 608 KHz, and the output of oscillator 4 is applied as the input to cascaded flip-flops 5, 6, 7, 8, and 9 acting as frequency dividers, each flip-flop dividing its input frequency by two. Thus, the output of flip-flop 5 is 304 KHz; the output of flip-flop 6, 152 KHz; the output of flip-flop 7, 76 KHz; the output of flip-flop 8, 38 KHz; and the output of flip-flop 9, 19 KHz, which is the frequency of the pilot signal. The phase comparator 2, amplifier 3, VCO 4, and flip-flops 5, 6, 7, 8, and 9 constitute a phase lock loop (PLL) circuit.

The sampling pulse outputs are formed by waveform synthesis circuits 10 and 11 each of which consists of an OR-gate for forming the logical sum of selected outputs from flip-flops 5, 6, 7, and 8. The waveform synthesis circuit 10 uses the outputs of output terminal Q of the flip-flops 5, 6, and 7, and the output of the output terminal $\overline{Q}$ of flip-flop 8 as inputs, performs a logical sum operation, and provides an output to the sampling pulse output terminal 12. Waveform synthesis circuit 11 uses the outputs of the output terminal Q of the flip-flops 5, 6, 7, and 8 as inputs, performs a logical sum operation, and provides an output to the sampling pulse output terminal 13.

Figure 2:
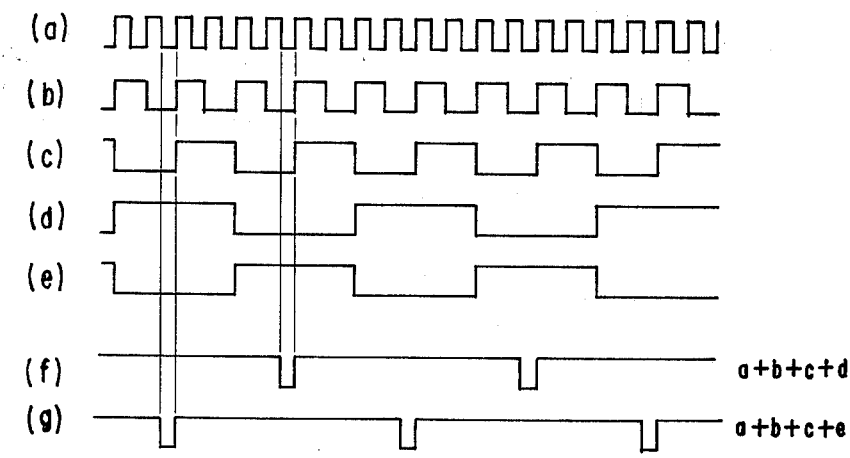
FIG. 2 shows waveform diagrams illustrating the operation of the embodiment shown in FIG. 1.

In this practical example configured as above, the voltage control oscillator 4 oscillates at a free-running frequency of 608 KHz. With reference to FIG. 2, the 304 KHz square waves as shown in FIG. 2(a) are outputted from the true output terminal Q of the flip-flop 5, the 152 KHz square waves as shown in FIG. 2(b) are outputted from the true output terminal Q of flip-flop 6, and the 76 KHz square waves as shown in FIG. 2(c) are outputted from the true output terminal Q of flip-flop 7. And, from the true output terminal Q of flip-flop 8, the 38 KHz square waves as shown in FIG. 2(d) are outputted, and from the complement output terminal $\overline{Q}$, inverted 38 KHz square waves from the FIG. 2(d) square waves as shown in FIG. 2(e) are outputted.

The output of flip-flop 9 is a 19 KHz square wave, and the 19 KHz output of flip-flop 9 and the pilot signals from the pilot signal input terminal 1 are compared for phase with the phase comparator 2. When a phase error is generated, that error signal is amplified by the DC amplifier 3. The oscillation frequency of voltage control oscillator 4 is controlled by the output signals of DC amplifier 3, and the output of flip-flop 9 is phase-synchronized to the pilot signal.

Next, output pulses of flip-flops 5, 6, 7, and 8 shown in FIG. 2(a), (b), (c), and (e) are impressed on waveform synthesis circuit 10. Then, a logical sum operation is performed, and the 38 KHz left channel sampling pulse as shown in FIG. 2(g), having the identical pulse width as the 304 KHz pulse width (≃1.5 μsec), is obtained from the sampling pulse output terminal 12 of waveform synthesis circuit 10. And, output pulses of flip-flops 5, 6, 7, and 8 shown in FIG. 2(a), (b), (c), and (d) are impressed on waveform synthesis circuit 11. Then, a logical sum operation is performed, and the 38 KHz right-channel sampling pulse as shown in FIG. 2(f), with a 180° difference in phase from the said left-channel sampling pulse and having the identical pulse width as the 304 KHz pulse width (≃1.5 μsec), is obtained from sampling pulse output terminal 13 of waveform synthesis circuit 11.

As explained above, when this invention is applied, all the square waves used as input signals of the waveform synthesis circuit that outputs the sampling pulses are square waves in the PLL circuit. Since they are square waves with a 50% duty cycle caused by flip-flops, the sampling pulses obtained from the waveform synthesis circuit are stable pulses.

In addition, since the pulse width of the sampling pulses is regulated by the pulse width of the 304 KHz square waves, the pulse width of the sampling pulse need not be adjusted.

What is claimed is:

1. A sampling pulse generator circuit of a stereo demodulator with a sample and hold system, comprising:
   a phase lock loop circuit receiving as its input the pilot signal of an FM stereo broadcast and having a multiple number of frequency dividers in cascade where the output from each frequency divider is at least one train of rectangular pulses of predetermined frequency, and
   first and second waveform synthesis circuits receiving as inputs selected outputs of said frequency dividers where the narrowest pulse width input to said waveform synthesis circuits is one of said train of rectangular pulses to thereby produce, respectively, first and second sampling pulses having 180° phase difference to each other, each with a predetermined and stable pulse width determined by said narrowest pulse width input.

2. The sampling pulse generator circuit of claim 1 wherein said frequency dividers are flip-flops.

3. The sampling pulse generator circuit of claims 1 or 2 wherein said first and second waveform synthesis circuits perform the logical sum operation on their respective inputs to produce said first and second sampling pulses.

4. The sampling pulse generator circuit of claim 3 wherein said first and second waveform synthesis circuits are each composed of an OR-gate.

5. The sampling pulse generator circuit of claim 1 wherein said phase lock loop further includes
   a phase comparator receiving as one input said pilot signal and producing an output error signal, and
   voltage controlled oscillating means responsive to said error signal for producing an output oscillation signal, said output oscillation signal being supplied to the input of said multiple number of frequency dividers the output of which being supplied as another input to said phase comparator.

6. The sampling pulse generator circuit of claim 5 wherein said frequency dividers are flip-flops having true and complementary outputs and said first and second waveform synthesis circuits are each composed of an OR-gate.

7. A method of producing sampling pulses for a stereo demodulator with a sample and hold system comprising the steps of
   receiving the pilot signal of an FM stereo broadcast,
   phase locking an oscillator to the received pilot signal,
   frequency dividing the output of said oscillator by a plurality of frequency dividers a multiple number of times to provide a plurality of frequency divided signals where the output from each frequency divider is at least one train of rectangular pulses of predetermined frequency, and
   logically summing selected ones of said frequency divided signals by first and second waveform synthesis circuits to produce first and second sampling pulses having 180° phase difference to each other where the narrowest pulse width input to said waveform synthesis circuits is one of said train of rectangular pulses, each with a predetermined and stable pulse width determined by said narrowest pulse width input.

8. The sampling pulse generator circuit of claim 1 where the frequency and pulse width of each said sampling pulses is 38 KHz and 1.5 $\mu$ sec. respectively.

9. The sampling pulse generator circuit of claim 1 where said sampling pulses are directly applied to said sample and hold system.

10. A sampling pulse generator circuit of a stereo demodulator with a sample and hold system, comprising:
    a phase lock loop circuit receiving as its input the pilot signal of an FM stereo broadcast and having a multiple number of frequency dividers in cascade,
    first and second waveform synthesis circuits receiving as inputs selected outputs of said frequency dividers to produce, respectively, first and second sampling pulses having 180° phase difference to each other, each with a predetermined and stable pulse width,
    said phase lock loop further including
      a phase comparator receiving as one input said pilot signal and producing an output error signal, and
      voltage controlled oscillating means responsive to said error signal for producing an output oscillation signal, said output oscillation signal being supplied to the input of said multiple number of frequency dividers the output of which being supplied as another input to said phase comparator, and
    wherein said pilot signal has a frequency of 19 KHz and the free-running frequency of said voltage controlled oscillating means is 608 KHz, said frequency dividers comprise first, second, third, fourth and fifth flip-flops connected in cascade with the true outputs of the first, second and third flip-flops and the complementary output of the fourth flip-flop supplied to the inputs of said first waveform synthesis circuit and the true outputs of the first, second, third, and fourth flip-flops supplied to the inputs of said second waveform synthesis circuit.

* * * * *